United States Patent
Molyneaux

(10) Patent No.: US 11,620,792 B2
(45) Date of Patent: *Apr. 4, 2023

(54) FAST HAND MESHING FOR DYNAMIC OCCLUSION

(71) Applicant: Magic Leap, Inc., Plantation, FL (US)

(72) Inventor: David Geoffrey Molyneaux, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,739

(22) Filed: Dec. 20, 2021

(65) Prior Publication Data
US 2022/0114788 A1 Apr. 14, 2022

Related U.S. Application Data

(63) Continuation of application No. 16/912,637, filed on Jun. 25, 2020, now Pat. No. 11,238,651.

(Continued)

(51) Int. Cl.
*G06T 17/00* (2006.01)
*G06T 17/20* (2006.01)
(Continued)

(52) U.S. Cl.
CPC .......... *G06T 17/20* (2013.01); *G02B 27/0093* (2013.01); *G02B 27/0101* (2013.01); *G02B 27/0172* (2013.01); *G06T 15/205* (2013.01); *G06V 20/20* (2022.01); *G06V 40/107* (2022.01); *G06V 40/28* (2022.01); *G02B 2027/0138* (2013.01); *G06T 2215/16* (2013.01)

(58) Field of Classification Search
None
See application file for complete search history.

(56) References Cited

U.S. PATENT DOCUMENTS

| 5,886,702 A | 3/1999 | Migdal et al. |
| 7,280,109 B2 | 10/2007 | Hoppe |

(Continued)

OTHER PUBLICATIONS

International Search Report and Written Opinion dated Oct. 13, 2020 in connection with International Application No. PCT/US2020/039601.

(Continued)

*Primary Examiner* — Martin Mushambo
(74) *Attorney, Agent, or Firm* — Wolf, Greenfield & Sacks, P.C.

(57) ABSTRACT

An augmented reality/mixed reality system that provides an immersive user experience. That experience is provided with increased speed of update with low computational resources for occlusion data representing a user's hand that can be used to occlude virtual objects. The hand occlusion data are generated by computing a hand mesh from live depth sensor data. A small amount of data is processed by masking live depth data with a model in which a hand is simply represented by multiple segments identified from key-points. The hand occlusion data may be generated by predicting changes in a hand pose between a time of capture of the depth data and the time when the hand mesh will be used for occlusion processing. The hand mesh may be distorted to represent the hand in the predicted pose.

20 Claims, 10 Drawing Sheets

Related U.S. Application Data

(60) Provisional application No. 62/868,640, filed on Jun. 28, 2019.

(51) Int. Cl.
*G06T 15/20* (2011.01)
*G02B 27/00* (2006.01)
*G02B 27/01* (2006.01)
*G06V 20/20* (2022.01)
*G06V 40/20* (2022.01)
*G06V 40/10* (2022.01)

(56) References Cited

U.S. PATENT DOCUMENTS

| | | |
|---|---|---|
| 10,565,784 B2 | 2/2020 | Holz |
| 10,565,791 B2 | 2/2020 | Shen et al. |
| 10,803,616 B1 | 10/2020 | Twigg et al. |
| 11,238,651 B2 | 2/2022 | Molyneaux |
| 2007/0188490 A1 | 8/2007 | Kanai et al. |
| 2007/0247459 A1 | 10/2007 | Li |
| 2010/0208994 A1 | 8/2010 | Yao et al. |
| 2010/0315412 A1 | 12/2010 | Sinha et al. |
| 2011/0066405 A1 | 3/2011 | Chartrand et al. |
| 2012/0154400 A1 | 6/2012 | Steen |
| 2012/0194516 A1 | 8/2012 | Newcombe et al. |
| 2012/0270653 A1 | 10/2012 | Kareemi et al. |
| 2013/0093788 A1 | 4/2013 | Liu et al. |
| 2013/0342564 A1 | 12/2013 | Kinnebrew et al. |
| 2014/0044343 A1 | 2/2014 | Bell et al. |
| 2015/0024337 A1* | 1/2015 | Blassnig .................. G06T 7/579 433/29 |
| 2015/0062120 A1 | 3/2015 | Reisner-Kollmann et al. |
| 2015/0109415 A1 | 4/2015 | Son et al. |
| 2016/0026253 A1 | 1/2016 | Bradski et al. |
| 2016/0027215 A1 | 1/2016 | Burns et al. |
| 2016/0148433 A1 | 5/2016 | Petrovskaya et al. |
| 2016/0364912 A1 | 12/2016 | Cho et al. |
| 2017/0278304 A1 | 9/2017 | Hildreth et al. |
| 2019/0094981 A1 | 3/2019 | Bradski et al. |
| 2019/0278983 A1 | 9/2019 | Iqbal et al. |
| 2020/0372246 A1 | 11/2020 | Chidananda et al. |
| 2020/0410753 A1 | 12/2020 | Molyneaux |

OTHER PUBLICATIONS

International Preliminary Report on Patentability dated Jan. 6, 2022 in connection with International Application No. PCT/US2020/039601.

PCT/US2020/039601, Oct. 13, 2020, International Search Report and Written Opinion.

PCT/US2020/039601, Jan. 6, 2022, International Preliminary Report on Patentability.

* cited by examiner

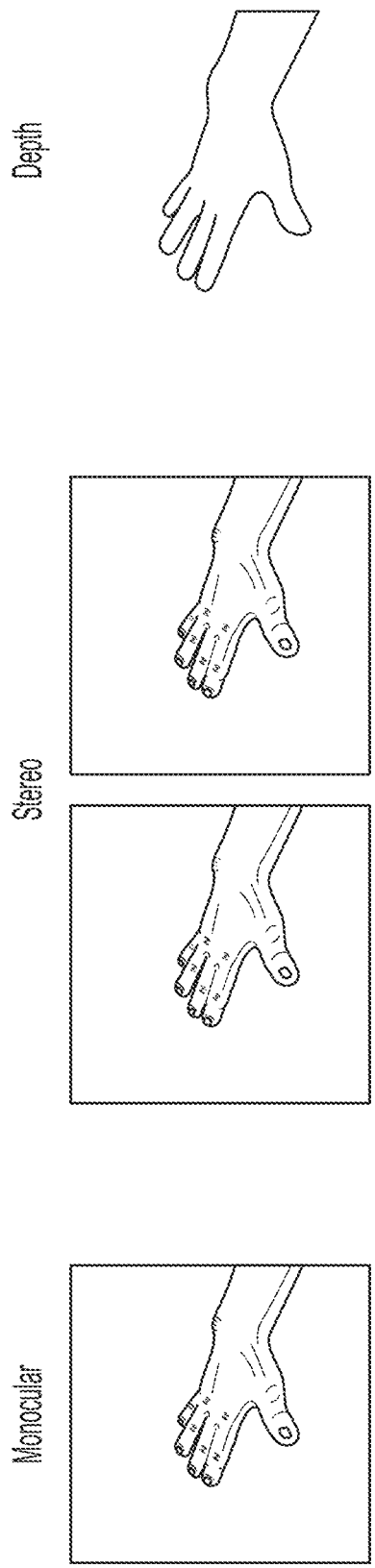
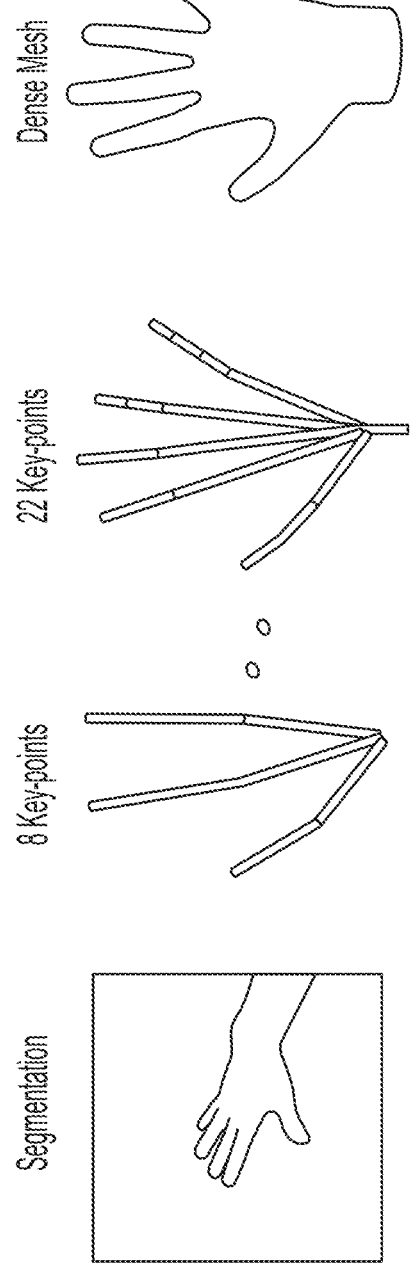

FAST HAND MESHING FOR DYNAMIC OCCLUSION

CROSS-REFERENCE TO RELATED APPLICATIONS

This application is a continuation of U.S. patent application Ser. No. 16/912,637, filed Jun. 25, 2020, entitled "FAST HAND MESHING FOR DYNAMIC OCCLUSION," which claims priority to and the benefit of U.S. Provisional Patent Application Ser. No. 62/868,640, filed Jun. 28, 2019, entitled "FAST HAND MESHING FOR DYNAMIC OCCLUSION." The entire contents of these applications are hereby incorporated herein by reference in their entirety.

TECHNICAL FIELD

This application relates generally to cross reality systems that use a 3D world reconstruction to render scenes.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

An XR system may represent the physical world around a user of the system as a "mesh." A mesh may be represented by multiple, interconnected triangles. Each triangle has edges joining points on a surface of an object within the physical world, such that each triangle represents a portion of the surface. Information about the portion of the surface, such as color, texture or other properties may be stored in associate within the triangle. In operation, an XR system may process image information to detect points that and surfaces so as to create or update the mesh.

BRIEF SUMMARY

Aspects of the present application relate to methods and apparatus for fast hand meshing for dynamic occlusion. Techniques as described herein may be used together, separately, or in any suitable combination.

Some embodiments relate to a method of operating a computing system to reconstruct a hand for dynamically occluding a virtual object. The method comprises receiving a query from an application rendering a virtual object in a scene for data related to a hand in the scene; capturing information of the scene from a device worn by a user, the device comprising one or more sensors, the information of the scene comprising depth information indicating distances between the device worn by the user and physical objects in the scene; detecting whether the physical objects in the scene comprises a hand; when the hand is detected, computing a model of the hand based, at least in part, on the information of the scene; masking, with the model of the hand, the depth information indicating the distances between the device worn by the user and the physical objects in the scene; computing a hand mesh based on the depth information masked to the model of the hand, the computing comprising updating the hand mesh in real time as relative locations between the device and the hand change; and supplying the hand mesh to the application such that the application renders portions of the virtual object not occluded by the hand mesh.

In some embodiments, the model of the hand comprises a plurality of key-points of the hand indicating points on segments of the hand.

In some embodiments, at least a portion of the plurality of key-points of the hand correspond to joints of the hand and tips of fingers of the hand.

In some embodiments, the method further comprises determining an outline of the hand based on the plurality of key-points; and masking, with the model of the hand, the depth information indicating the distances between the device worn by the user and the physical objects in the scene. Masking the depth information comprises: filtering out the depth information that is outside the outline of the model of the hand; and generating a depth image of the hand based, at least in part, on the filtered depth information, the depth image comprising a plurality of pixels, each pixel indicating a distance to a point of the hand.

In some embodiments, filtering out the depth information that is outside the outline of the model of the hand comprises removes depth information associated with the physical objects in the scene.

In some embodiments, masking, with the model of the hand, the depth information indicating the distances between the device worn by the user and the physical objects in the scene comprises: associating portions of the depth image to hand segments; and updating the hand mesh in real time comprises selectively updating portions of the hand mesh representing a proper subset of the hand segments.

In some embodiments, the method further comprises filling holes in the depth image before computing the hand mesh.

In some embodiments, filling holes in the depth image comprises generating stereo depth information from a stereo camera of the device, the stereo depth information corresponding to regions of the holes in the depth image.

In some embodiments, filling holes in the depth image comprises accessing surface information from a 3D model of a hand, the surface information corresponding to regions of the holes in the depth image.

In some embodiments, computing the hand mesh based on the depth information masked to the model of the hand comprises: predicting a latency n from the query received at time t from the application rendering the virtual object in the scene for the data related to a hand in the scene; predicting a hand pose at a time of the query time t plus the latency n; and distorting the hand mesh with the predicted pose at the time of the query time t plus the latency n.

In some embodiments, the depth information indicating the distances between the device worn by the user and the physical objects in the scene comprises a sequence of depth images at a frame rate of at least 30 frames per second.

Some embodiments relate to an electronic system portable by a user. The electronic system comprises a device worn by the user. The device comprises a display configured to render a virtual object and comprises one or more sensors configured to capture a headpose of the user wearing the device and information of a scene comprising one or more physical objects, the information of the scene comprising depth information indicating distances between the device and the one or more physical objects. The electronic system comprises a hand meshing component configured to execute computer executable instructions to detect a hand in the scene and compute a hand mesh of the detected hand and update the hand mesh in real time as the head pose changes and/or the hand moves; and an application configured to execute computer executable instructions to render the virtual object in the scene, wherein the application receives, from the hand meshing component, the hand mesh and portions of the virtual object that is occluded by the hand.

In some embodiments, the hand meshing component is configured to compute a hand mesh by identifying key-points on the hand; computing segments between the keypoints; selecting, from the depth information, information based on proximity to one or more of the computed segments; and computing a mesh representing at least a portion of the hand mesh based on the selected depth information.

In some embodiments, the depth information comprises a plurality of pixels, each of the plurality of pixels representing a distance to an object in the scene. Computing the mesh comprises grouping adjacent pixels representing a difference in distance less than a threshold.

Some embodiments relate to a method of operating an AR system to render a virtual object in a scene including physical objects. The AR system comprises at least one sensor and at least one processor. The method comprises: capturing information of a scene with the at least one sensor, the information of the scene comprising depth information indicating distances to physical objects in the scene; with the at least one processor: processing the captured information to detect a hand in the scene and compute points on the hand; selecting, based on proximity to the computed points on the hand, a subset of the depth information; and computing a representation of the hand based on the selected depth information, wherein the representation of the hand indicates surfaces of the hand.

In some embodiments, the method further comprise storing the computed representation of the hand; and successively processing captured information to update the stored representation of the hand.

In some embodiments, computing the representation of the hand comprises: computing, based on the captured information, one or more parameters of motion of the hand; projecting, based on the one or more parameters of motion, a position of the hand at a future time, determined based on a latency associated with rendering a virtual object using the computed representation of the hand; and morphing the computed representation of the hand to represent the hand in the projected position.

In some embodiments, the method further comprises rendering a selected portion of the virtual object based on the representation of the hand, wherein the selected portion represents portions of the virtual object not occluded by the hand.

In some embodiments, the depth information comprises a depth map comprising a plurality of pixels, each representing a distance. Computing the representation of the hand based on the selected depth information comprises identifying groups of pixels representing surface segments.

In some embodiments, computing the representation of the hand comprises defining a mesh representing the hand based on the identified groups of pixels.

In some embodiments, defining the mesh comprises identifying triangular regions corresponding to the identified surface segments.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 9A is an exemplary image captured by one sensor corresponding to an eye, according to some embodiments.

FIG. 9B is two exemplary images captured by two sensor corresponding to left and right eyes, according to some embodiments.

FIG. 9C is an exemplary depth image, which may be obtained at least partially from the image of FIG. 9A or the images of FIG. 9B, according to some embodiments.

FIG. 9D is an exemplary image illustrating an outline of a model of a hand of FIG. 8, according to some embodiments.

FIG. 9E is a schematic diagram illustrating an exemplary eight key-points model of a hand, according to some embodiments.

FIG. 9F is a schematic diagram illustrating an exemplary twenty-two key-points model of a hand, according to some embodiments.

FIG. 9G is a schematic diagram illustrating a dense hand mesh, according to some embodiments.

DETAILED DESCRIPTION

Figure 1:
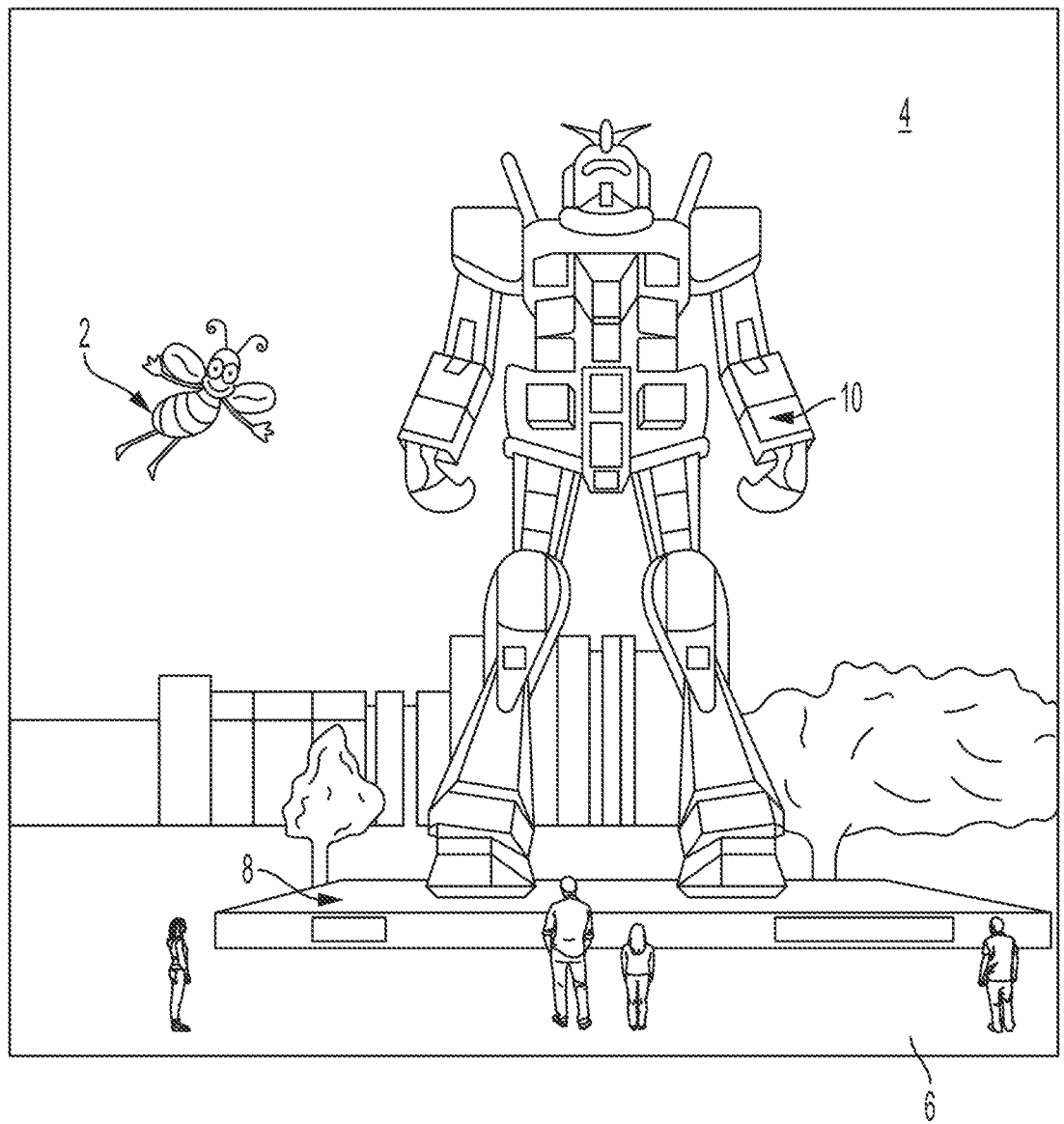
FIG. 1 is a sketch illustrating an example of a simplified augmented reality (AR) scene, according to some embodiments.

Described herein are methods and apparatus for fast hand meshing for dynamic occlusion in an X reality (XR) system. An XR system may create and use a three-dimensional (3D) world reconstruction. To provide realistic XR experiences to users, the XR system must know the user's physical surroundings in order to correctly correlate a location of virtual objects in relation to real objects. The world reconstruction may be constructed from image and depth information about those physical surroundings that are collected with sensors that are part of the XR system. The world reconstruction may then be used by any of multiple components of such a system. For example, the world reconstruction may be used by components that perform visual occlusion processing, compute physics-based interactions or perform environmental reasoning.

Occlusion processing identifies portions of a virtual object that should not be rendered for and/or displayed to a user because there is an object in the physical world blocking that user's view of the location where that virtual object is to be perceived by the user. Physics-based interactions are computed to determine where or how a virtual object appears to the user. For example, a virtual object may be rendered so as to appear to be resting on a physical object, moving through empty space or colliding with a surface of a physical object. The world reconstruction provides a model from which information about objects in the physical world may be obtained for such calculations.

There are significant challenges in providing such a system. Substantial processing may be required to compute the world reconstruction and occlusion information. Further, the XR systems must correctly know how to position virtual objects in relation to the user's head, body, etc. As the user's position in relation to the physical environment changes, the relevant portions of the physical world can also change, which can require further processing. Moreover, the 3D reconstruction data are often required to be updated as objects move in the physical world (e.g., a cup moves on a table). Updates to the data representing the environment that the user is experiencing must be performed quickly without using so much of the computing resources of the computer generating the XR environment because it is unable to perform other functions while performing world reconstruction. Further, the processing of reconstruction data by components that "consume" that data can exacerbate the demands on computer resources.

Dynamic occlusion processing identifies portions of a virtual object that should not be rendered for and/or displayed to a user because there is a physical object blocking that user's view of the location where that virtual object is to be perceived by the user and relative positions between the physical object and the virtual object change over time. Occlusion processing to account for a user's hand can be particularly important for providing a desirable XR experience. The inventors have recognized and appreciated, however, that improved occlusion processing specifically for hands may provide a more realistic XR experience for a user. An XR system, for example, might generate a mesh for objects that is used in occlusion processing based on graphic images, which are taken at a frame rate of around 5 frames per second (fps). That rate, however, might not meet the speed of location changes between a hand and virtual objects behind the hand due to a hand motion and/or a head motion, e.g., above 15 fps, above 30 fps, or above 45 fps.

A user of an XR device may interact with the device through gesturing with a hand. Hands are latency critical as they are directly used in user interaction. A hand of a user may move fast during an interaction with the device, e.g., faster than a user moving to scan a physical environment for world reconstruction. Further, a hand of a user is closer to the XR device worn by the user. Thus, the relative position between a user hand and virtual objects behind the hand is also sensitive to a head motion. If the representation of the hand used for occlusion processing is not updated fast enough to keep up with these sources of relative motion, the occlusion processing will not be based on the location of the hand and occlusion processing will be inaccurate. If the virtual objects behind the hand are not correctly rendered to appear occluded by the hand during hand motion and/or head motion, the XR scene will appear unrealistic to the user. The virtual object may appear on top of the hand as if the hand is transparent. The virtual object may otherwise not appear to be in its intended location. The hand may appear to have the color pattern of the virtual object or other artifacts may appear. As a result, motion of the hand breaks the user's immersion in the XR experience.

The inventors have recognized and appreciated that, when the object that occludes virtual objects is the user's hand, there can be a particularly high computational demand required. However, that computational burden can be lessened by techniques that generate hand occlusion data at a high rate with low computation resources. The hand occlusion data may be generated by computing a hand mesh from live depth sensor data, which is taken at a higher frequency than graphic images. In some embodiments, live depth sensor data may be taken at a frame rate of at least 30 fps. To enable fast processing of that data, a small amount of data may be processed to make a model of the hand used in occlusion processing by masking live depth data with a model in which a hand is simply represented by multiple segments identified from key-points. Further, to increase the accuracy of the occlusion processing, the hand occlusion data may be generated by predicting changes in a hand pose between a time of capture of the depth data and the time when the hand mesh will be used for occlusion processing. The hand mesh may be distorted to represent the hand in the predicted pose.

Techniques as described herein may be used together or separately with many types of devices and for many types of scenes, including wearable or portable devices with limited computations resources that provide a cross reality scene. In some embodiments, the techniques may be implemented by a service that forms a portion of an XR system.

Figure 2:
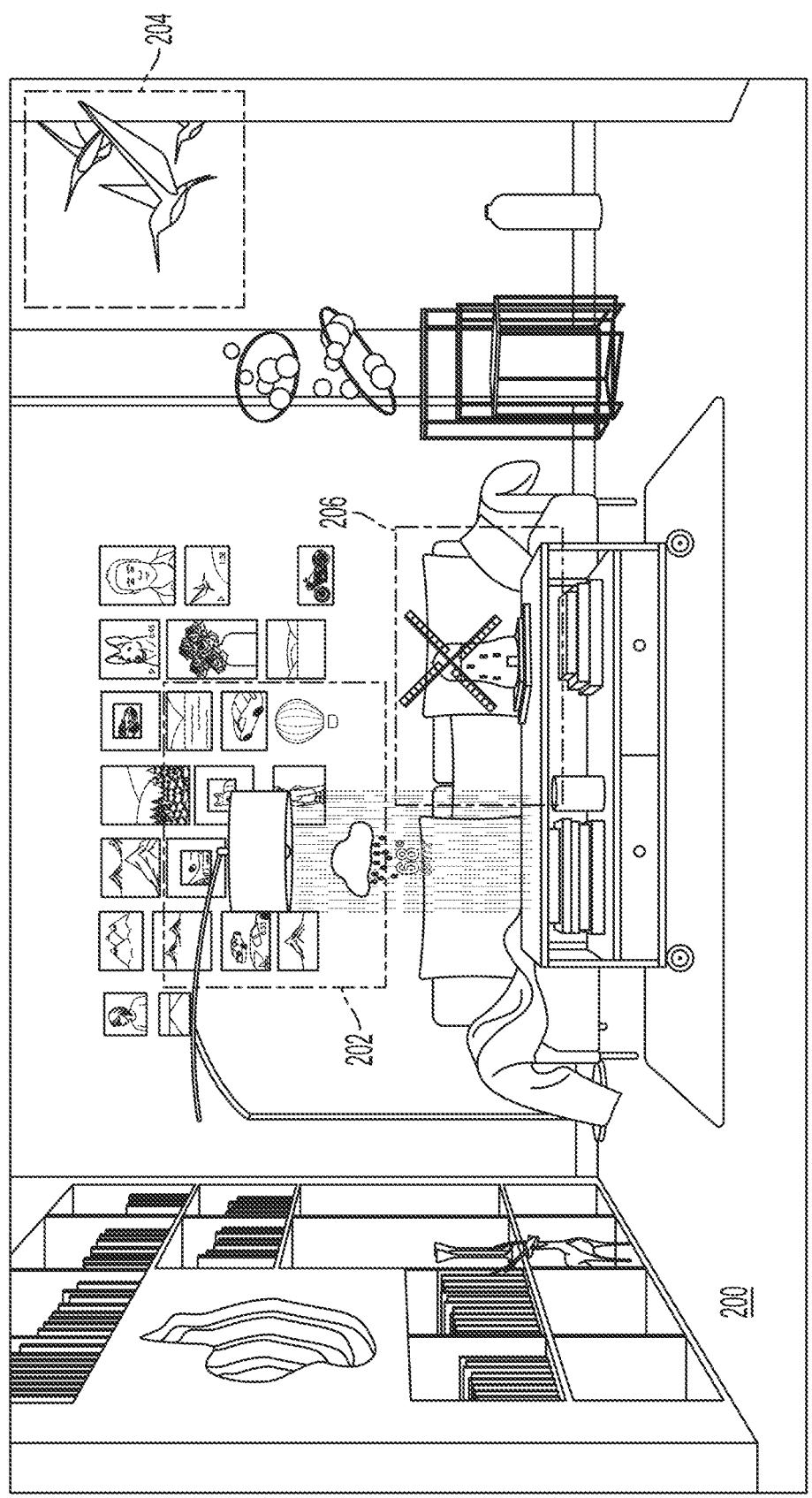
FIG. 2 is a sketch of an exemplary simplified AR scene, showing exemplary World Reconstruction use cases including visual occlusion, physics-based interactions, and environment reasoning, according to some embodiments.

FIGS. 1-2 illustrate such scenes. For purposes of illustration, an AR system is used as an example of an XR system. FIGS. 3-6 illustrate an exemplary AR system, including one or more processors, memory, sensors and user interfaces that may operate according to the techniques described herein.

Referring to Figure (FIG. 1, an outdoor AR scene 4 is depicted wherein a user of an AR technology sees a physical world park-like setting 6, featuring people, trees, buildings in the background, and a concrete platform 8. In addition to these items, the user of the AR technology also perceives that they "see" a robot statue 10 standing upon the physical world concrete platform 8, and a cartoon-like avatar character 2 flying by which seems to be a personification of a bumble bee, even though these elements (e.g., the avatar character 2, and the robot statue 10) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that include a world reconstruction component, which may build and update a representation of the physical world surfaces around the user. This representation may be used to occlude rendering, to place virtual objects, in physics based interactions, and for virtual character path planning and navigation, or for other operations in which information about the physical world is used. FIG. 2 depicts another example of an indoor AR scene 200, showing exemplary world reconstruction use cases, including visual occlusion 202, physics-based interactions 204, and environment reasoning 206, according to some embodiments.

The exemplary scene 200 is a living room having walls, a book shelf on one side of a wall, a floor lamp at a corner of the room, a floor, a sofa and coffee table on the floor. In addition to these physical items, the user of the AR technology also perceives virtual objects such as images on the wall behind the sofa, birds flying through the door, a deer peeking out from the book shelf, and a decoration in the form of a windmill placed on the coffee table. For the images on the wall, the AR technology requires information about not only surfaces of the wall but also objects and surfaces in the room such as lamp shape, which are occluding the images to render the virtual objects correctly. For the flying birds flying, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may reason that it is movable, whereas corners of shelves or corners of the wall may be reasoned to be stationary. Such a distinction may be used in reasoning as to which portions of the scene are used or updated in each of various operations.

A scene may be presented to the user via a system that includes multiple components, including a user interface that can stimulate one or more user senses, including sight sound and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or more be distributed across multiple interconnected devices. In some embodiments some or all of these components may be integrated into a wearable device.

Figure 3:
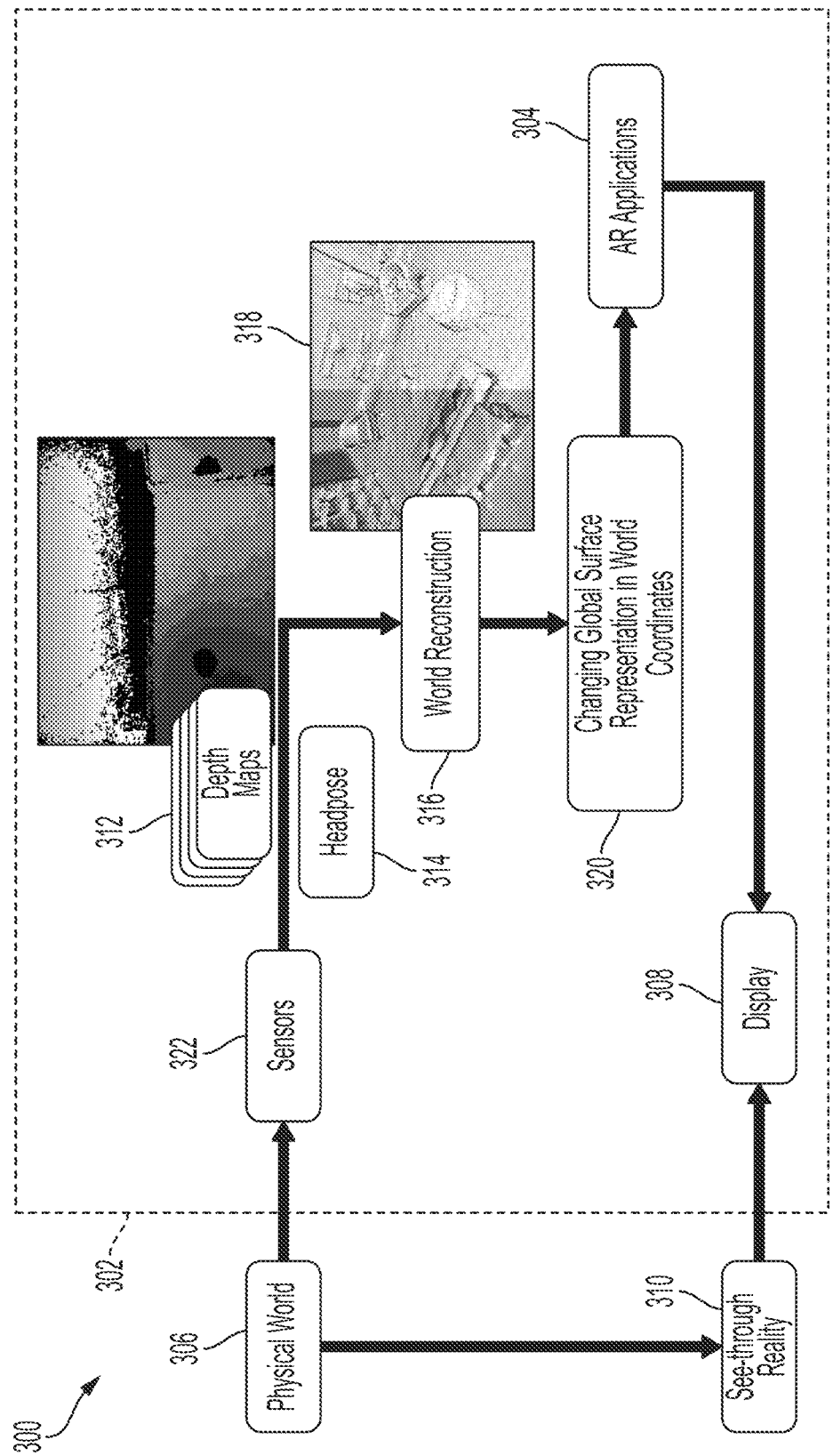
FIG. 3 is a schematic diagram illustrating data flow in an AR system configured to provide an experience of AR contents interacting with a physical world, according to some embodiments.

FIG. 3 depicts an AR system 302 configured to provide an experience of AR contents interacting with a physical world 306, according to some embodiments. The AR system 302 may include a display 308. In the illustrated embodiment, the display 308 may be worn by the user as part of a headset such that a user may wear the display over their eyes like a pair of goggles or glasses. At least a portion of the display may be transparent such that a user may observe a see-through reality 310. The see-through reality 310 may correspond to portions of the physical world 306 that are within a present viewpoint of the AR system 302, which may correspond to the viewpoint of the user in the case that the user is wearing a headset incorporating both the display and sensors of the AR system to acquire information about the physical world.

AR contents may also be presented on the display 308, overlaid on the see-through reality 310. To provide accurate interactions between AR contents and the see-through reality 310 on the display 308, the AR system 302 may include sensors 322 configured to capture information about the physical world 306.

The sensors 322 may include one or more depth sensors that output depth maps 312. Each depth map 312 may have multiple pixels, each of which may represent a distance to a surface in the physical world 306 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire information that may be processed to represent the physical world in other ways. For example, the images may be processed in world reconstruction component 316 to create a mesh, representing connected portions of objects in the physical world. Metadata about such objects, including for example, color and surface texture, may similarly be acquired with the sensors and stored as part of the world reconstruction.

The system may also acquire information about the headpose of the user with respect to the physical world. In some embodiments, sensors 310 may include inertial measurement units (IMU) that may be used to compute and/or determine a headpose 314. A headpose 314 for a depth map may indicate a present viewpoint of a sensor capturing the depth map with six degrees of freedom (6DoF), for example, but the headpose 314 may be used for other purposes, such as to relate image information to a particular portion of the physical world or to relate the position of the display worn on the user's head to the physical world. In some embodiments, the headpose information may be derived in other ways than from an IMU, such as from analyzing objects in an image.

The world reconstruction component 316 may receive the depth maps 312 and headposes 314, and any other data from the sensors, and integrate that data into a reconstruction 318, which may at least appear to be a single, combined reconstruction. The reconstruction 318 may be more complete and less noisy than the sensor data. The world reconstruction component 316 may update the reconstruction 318 using spatial and temporal averaging of the sensor data from multiple viewpoints over time.

The reconstruction 318 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 318, portions of the physical world are presented as a global surface; on the right side of the reconstruction 318, portions of the physical world are presented as meshes.

The reconstruction 318 may be used for AR functions, such as producing a surface representation of the physical world for occlusion processing or physics-based processing. This surface representation may change as the user moves or objects in the physical world change. Aspects of the reconstruction 318 may be used, for example, by a component 320 that produces a changing global surface representation in world coordinates, which may be used by other components.

The AR contents may be generated based on this information, such as by AR applications 304. An AR application 304 may be a game program, for example, that performs one or more functions based on information about the physical world, such as visual occlusion, physics-based interactions, and environment reasoning. It may perform these functions by querying data in different formats from the reconstruction 318 produced by the world reconstruction component 316. In some embodiments, component 320 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 304 may use this information to generate and update the AR contents. The virtual portion of the AR contents may be presented on the display 308 in combination with the see-through reality 310, creating a realistic user experience.

Figure 4:
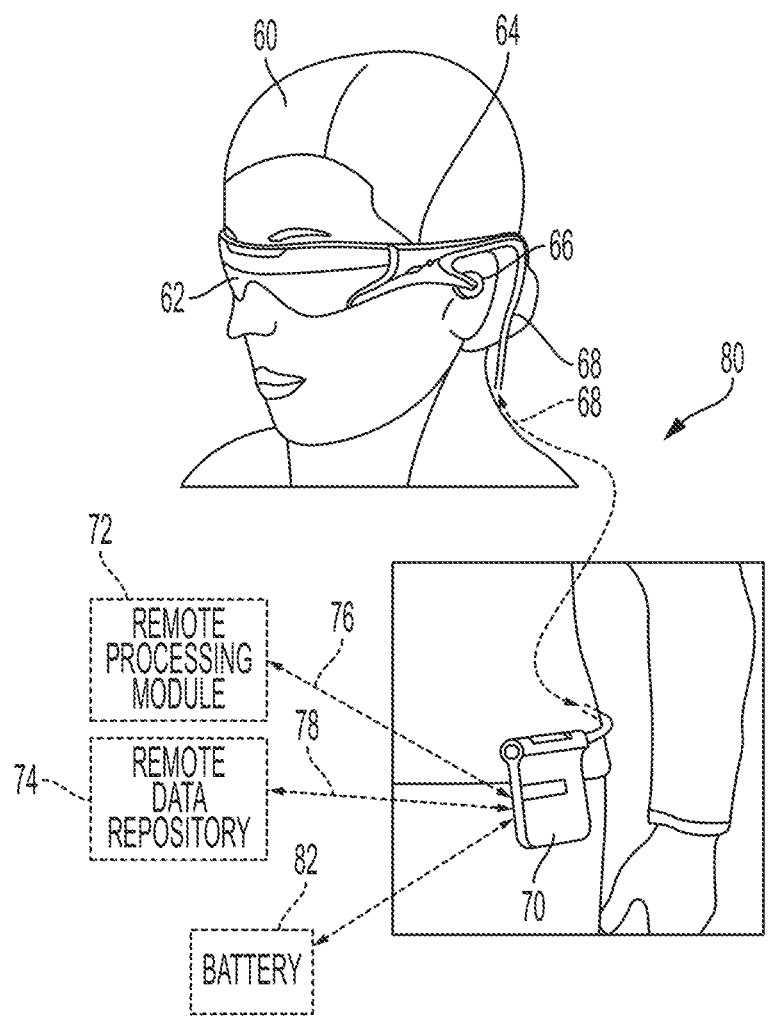
FIG. 4 is a schematic diagram illustrating an example of an AR display system, according to some embodiments.

In some embodiments, an AR experience may be provided to a user through a wearable display system. FIG. 4 illustrates an example of wearable display system 80 (hereinafter referred to as "system 80"). The system 80 includes a head mounted display device 62 (hereinafter referred to as "display device 62"), and various mechanical and electronic modules and systems to support the functioning of the display device 62. The display device 62 may be coupled to a frame 64, which is wearable by a display system user or viewer 60 (hereinafter referred to as "user 60") and configured to position the display device 62 in front of the eyes of the user 60. According to various embodiments, the display device 62 may be a sequential display. The display device 62 may be monocular or binocular. In some embodiments, the display device 62 may be an example of the display 308 in FIG. 3.

In some embodiments, a speaker 66 is coupled to the frame 64 and positioned proximate an ear canal of the user 60. In some embodiments, another speaker, not shown, is positioned adjacent another ear canal of the user 60 to provide for stereo/shapeable sound control. The display device 62 is operatively coupled, such as by a wired lead or wireless connectivity 68, to a local data processing module 70 which may be mounted in a variety of configurations, such as fixedly attached to the frame 64, fixedly attached to a helmet or hat worn by the user 60, embedded in headphones, or otherwise removably attached to the user 60 (e.g., in a backpack-style configuration, in a belt-coupling style configuration).

The local data processing module 70 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 64) or otherwise attached to the user 60, such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display device 62 after such processing or retrieval. The local data processing module 70 may be operatively coupled by communication links 76, 78, such as via a wired or wireless communication links, to the remote processing module 72 and remote data repository 74, respectively, such that these remote modules 72, 74 are operatively coupled to each other and available as resources to the local processing and data module 70. In some embodiments, the world reconstruction component 316 in FIG. 3 may be at least partially implemented in the local data processing module 70. For example, the local data processing module 70 may be configured to execute computer executable instructions to generate the physical world representations based at least in part on at least a portion of the data.

In some embodiments, the local data processing module 70 may include one or more processors (e.g., a graphics processing unit (GPU)) configured to analyze and process data and/or image information. In some embodiments, the local data processing module 70 may include a single processor (e.g., a single-core or multi-core ARM processor), which would limit the module 70's compute budget but enable a more miniature device. In some embodiments, the world reconstruction component 316 may use a compute budget less than a single ARM core to generate physical world representations in real-time on a non-predefined space such that the remaining compute budget of the single ARM core can be accessed for other uses such as, for example, extracting meshes.

In some embodiments, the remote data repository 74 may include a digital data storage facility, which may be available through the Internet or other networking configuration in a "cloud" resource configuration. In some embodiments, all data is stored and all computations are performed in the local data processing module 70, allowing fully autonomous use from a remote module. A world reconstruction, for example, may be stored in whole or in part in this repository 74.

In some embodiments, the local data processing module 70 is operatively coupled to a battery 82. In some embodiments, the battery 82 is a removable power source, such as over the counter batteries. In other embodiments, the battery 82 is a lithium-ion battery. In some embodiments, the battery 82 includes both an internal lithium-ion battery chargeable by the user 60 during non-operation times of the system 80 and removable batteries such that the user 60 may operate the system 80 for longer periods of time without having to be tethered to a power source to charge the lithium-ion battery or having to shut the system 80 off to replace batteries.

Figure 5A:
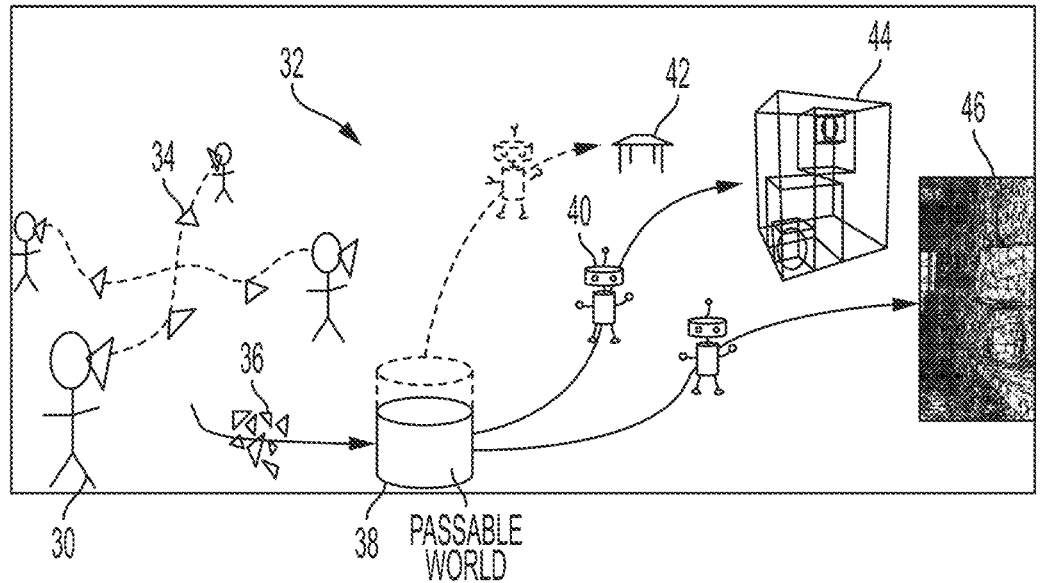
FIG. 5A is a schematic diagram illustrating a user wearing an AR display system rendering AR content as the user moves through a physical world environment, according to some embodiments.

FIG. 5A illustrates a user 30 wearing an AR display system rendering AR content as the user 30 moves through a physical world environment 32 (hereinafter referred to as "environment 32"). The user 30 positions the AR display system at positions 34, and the AR display system records ambient information of a passable world (e.g., a digital representation of the real objects in the physical world that can be stored and updated with changes to the real objects in the physical world) relative to the positions 34 such as pose relation to mapped features or directional audio inputs. The positions 34 are aggregated to data inputs 36 and processed at least by a passable world module 38, which may be implemented, for example, by processing on a remote processing module 72 of FIG. 4. In some embodiments, the passable world module 38 may include the world reconstruction component 316.

The passable world module 38 determines where and how AR content 40 can be placed in the physical world as determined from the data inputs 36. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 42 (e.g., a table) from a reconstruction (e.g., the reconstruction 318) to determine the shape and position of the AR content 40. As an example, the fixed element may be a table and the virtual content may be positioned such that it appears to be on that table. In some embodiments, the AR content may be placed within structures in a field of view 44, which may be a present field of view or an estimated future field of view. In some embodiments, the AR content may be placed relative to a mapped mesh model 46 of the physical world.

As depicted, the fixed element 42 serves as a proxy for any fixed element within the physical world which may be stored in the passable world module 38 so that the user 30 can perceive content on the fixed element 42 without the system having to map to the fixed element 42 each time the user 30 sees it. The fixed element 42 may, therefore, be a mapped mesh model from a previous modeling session or determined from a separate user but nonetheless stored on the passable world module 38 for future reference by a plurality of users. Therefore, the passable world module 38 may recognize the environment 32 from a previously mapped environment and display AR content without a device of the user 30 mapping the environment 32 first, saving computation process and cycles and avoiding latency of any rendered AR content.

The mapped mesh model 46 of the physical world may be created by the AR display system and appropriate surfaces and metrics for interacting and displaying the AR content 40 can be mapped and stored in the passable world module 38 for future retrieval by the user 30 or other users without the need to re-map or model. In some embodiments, the data inputs 36 are inputs such as geolocation, user identification, and current activity to indicate to the passable world module 38 which fixed element 42 of one or more fixed elements are available, which AR content 40 has last been placed on the fixed element 42, and whether to display that same content (such AR content being "persistent" content regardless of user viewing a particular passable world model).

Even in embodiments in which objects are considered to be fixed, the passable world module 38 may be updated from time to time to account for the possibility of changes in the physical world. The model of fixed objects may be updated with a very low frequency. Other objects in the physical world may be moving or otherwise not regarded as fixed. To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 5B:
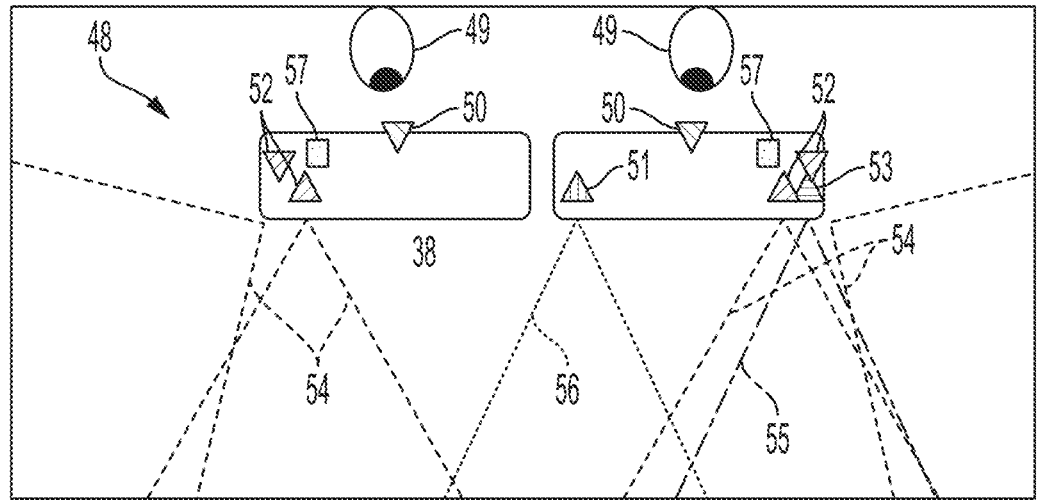
FIG. 5B is a schematic diagram illustrating a viewing optics assembly and attendant components, according to some embodiments.

FIG. 5B is a schematic illustration of a viewing optics assembly 48 and attendant components. In some embodiments, two eye tracking cameras 50, directed toward user eyes 49, detect metrics of the user eyes 49, such as eye shape, eyelid occlusion, pupil direction and glint on the user eyes 49. In some embodiments, one of the sensors may be a depth sensor 51, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 52 record a greater-than-peripheral view to map the environment 32 and detect inputs that may affect AR content. In some embodiments, the world camera 52 and/or camera 53 may be grayscale and/or color image sensors, which may output grayscale and/or color image frames at fixed time intervals. Camera 53 may further capture physical world images within a field of view of the user at a specific time. Pixels of a frame-based image sensor may be sampled repetitively even if their values are unchanged. Each of the world cameras 52, the camera 53 and the depth sensor 51 have respective fields of view of 54, 55, and 56 to collect data from and record a physical world scene, such as the physical world environment 32 depicted in FIG. 5A.

Inertial measurement units 57 may determine movement and orientation of the viewing optics assembly 48. In some embodiments, each component is operatively coupled to at least one other component. For example, the depth sensor 51 is operatively coupled to the eye tracking cameras 50 as a confirmation of measured accommodation against actual distance the user eyes 49 are looking at.

It should be appreciated that a viewing optics assembly 48 may include some of the components illustrated in FIG. 5B and may include components instead of or in addition to the components illustrated. In some embodiments, for example, a viewing optics assembly 48 may include two world camera 52 instead of four. Alternatively or additionally, cameras 52 and 53 need not capture a visible light image of their full field of view. A viewing optics assembly 48 may include other types of components. In some embodiments, a viewing optics assembly 48 may include one or more dynamic vision sensor (DVS), whose pixels may respond asynchronously to relative changes in light intensity exceeding a threshold.

In some embodiments, a viewing optics assembly 48 may not include the depth sensor 51 based on time of flight information. In some embodiments, for example, a viewing optics assembly 48 may include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 51.

It also should be appreciated that the configuration of the components in FIG. 5B is illustrated as an example. A viewing optics assembly 48 may include components with any suitable configuration, which may be set to provide the user with the largest field of view practical for a particular set of components. For example, if a viewing optics assembly 48 has one world camera 52, the world camera may be placed in a center region of the viewing optics assembly instead of at a side.

Information from the sensors in viewing optics assembly 48 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g. clip content to account for occlusions), when viewed through the user interface. Regardless of how content is presented to a user, a model of the physical world is required so that characteristics of the virtual objects, which can be impacted by physical objects, including the shape, position, motion and visibility of the virtual object, can be correctly computed. In some embodiments, the model may include the reconstruction of a physical world, for example, the reconstruction 318.

That model may be created from data collected from sensors on a wearable device of the user. Though, in some embodiments, the model may be created from data collected by multiple users, which may be aggregated in a computing device remote from all of the users (and which may be "in the cloud").

Figure 6:
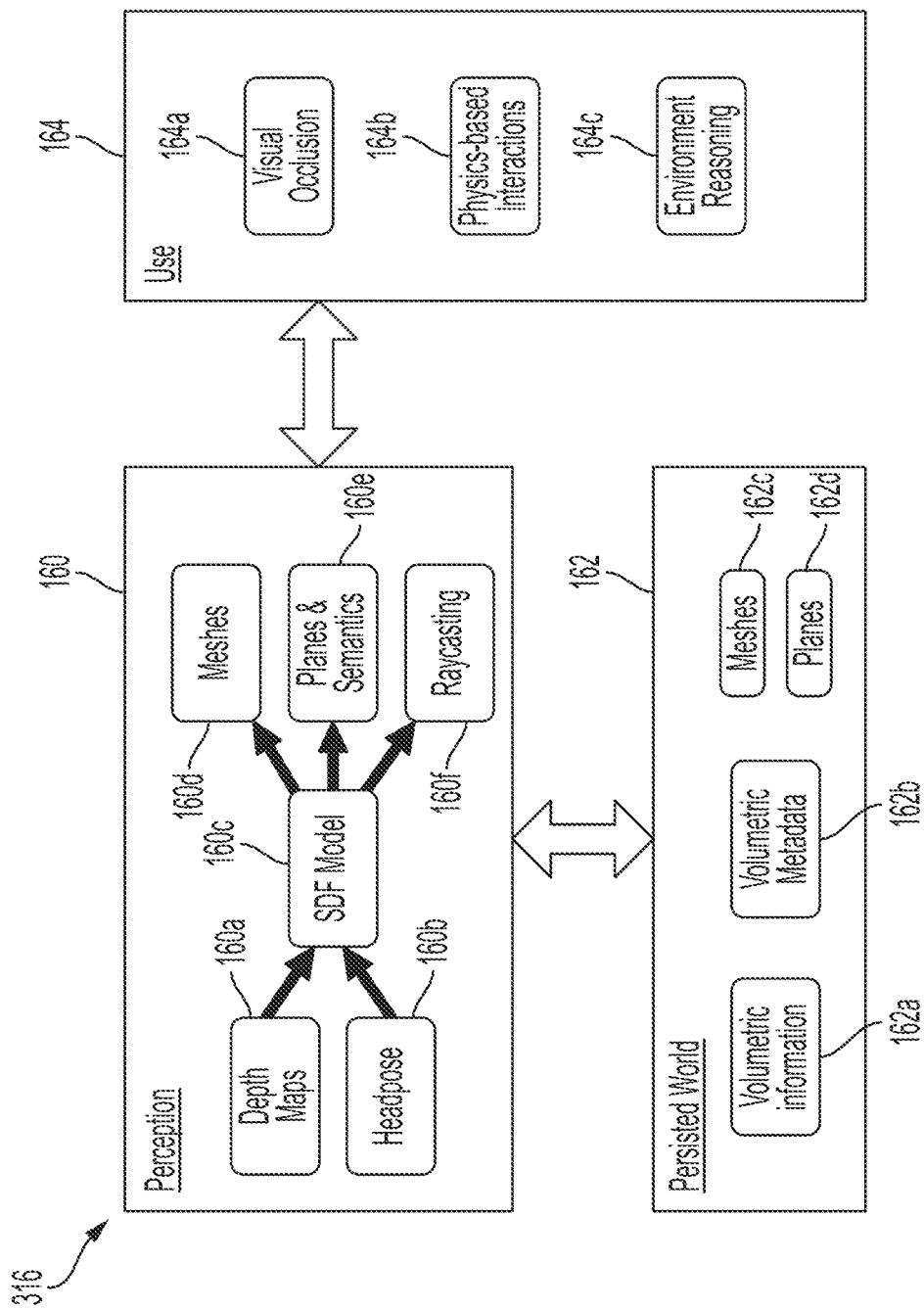
FIG. 6 is a schematic diagram illustrating an AR system using a world reconstruction system, according to some embodiments.

The model may be created, at least in part, by a world reconstruction system, for example, the world reconstruction component 316 of FIG. 3 depicted in more detail in FIG. 6. The world reconstruction component 316 may include a perception module 160 that may generate, update, and store representations for a portion of the physical world. In some embodiments, the perception module 160 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

In addition to generating information for a persisted world representation, the perception module 160 may identify and output indications of changes in a region around a user of an AR system. Indications of such changes may trigger updates to volumetric data stored as part of the persisted world, or trigger other functions, such as triggering components 304 that generate AR content to update the AR content.

In some embodiments, the perception module 160 may identify changes based on a signed distance function (SDF) model. The perception module 160 may be configured to receive sensor data such as, for example, depth maps 160a and headposes 160b, and then fuse the sensor data into a SDF model 160c. Depth maps 160a may provide SDF information directly, and images may be processed to arrive at SDF information. The SDF information represents distance from the sensors used to capture that information. As those sensors may be part of a wearable unit, the SDF information may represent the physical world from the perspective of wearable unit and therefore the perspective of the user. The headposes 160b may enable the SDF information to be related to a voxel in the physical world.

In some embodiments, the perception module 160 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may operate reliably over a range of distances, creating the observation range of the sensor, which may be from a few centimeters or tens of centimeters to a few meters.

The world reconstruction component 316 may include additional modules that may interact with the perception module 160. In some embodiments, a persisted world module 162 may receive representations for the physical world based on data acquired by the perception module 160. The persisted world module 162 also may include various formats of representations of the physical world. For example, volumetric metadata 162b such as voxels may be stored as well as meshes 162c and planes 162d. In some embodiments, other information, such as depth maps could be saved.

In some embodiments, the perception module 160 may include modules that generate representations for the physical world in various formats including, for example, meshes 160d, planes and semantics 160e. These modules may generate representations based on data within the perception range of one or more sensors at the time the representation is generated as well as data captured at prior times and information in the persisted world 162. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 160 detects a change in the physical world in that subregion. Such a change, for example, may be detected by detecting a new surface in the SDF model 160c or other criteria, such as changing the value of a sufficient number of voxels representing the subregion.

The world reconstruction component 316 may include components 164 that may receive representations of the physical world from the perception module 160. Information about the physical world may be pulled by these components according to, for example, a use request from an application. In some embodiments, information may be pushed to the use components, such as via an indication of a change in a pre-identified region or a change of the physical world representation within the perception range. The components 164, may include, for example, game programs and other components that perform processing for visual occlusion, physics-based interactions, and environment reasoning.

Responding to the queries from the components 164, the perception module 160 may send representations for the physical world in one or more formats. For example, when the component 164 indicates that the use is for visual occlusion or physics-based interactions, the perception module 160 may send a representation of surfaces. When the component 164 indicates that the use is for environmental reasoning, the perception module 160 may send meshes, planes and semantics of the physical world.

In some embodiments, the perception module 160 may include components that format information to provide to component 164. An example of such a component may be raycasting component 160f. A use component (e.g., component 164), for example, may query for information about the physical world from a particular point of view. Raycasting component 160f may select from one or more representations of the physical world data within a field of view from that point of view.

Figure 7:
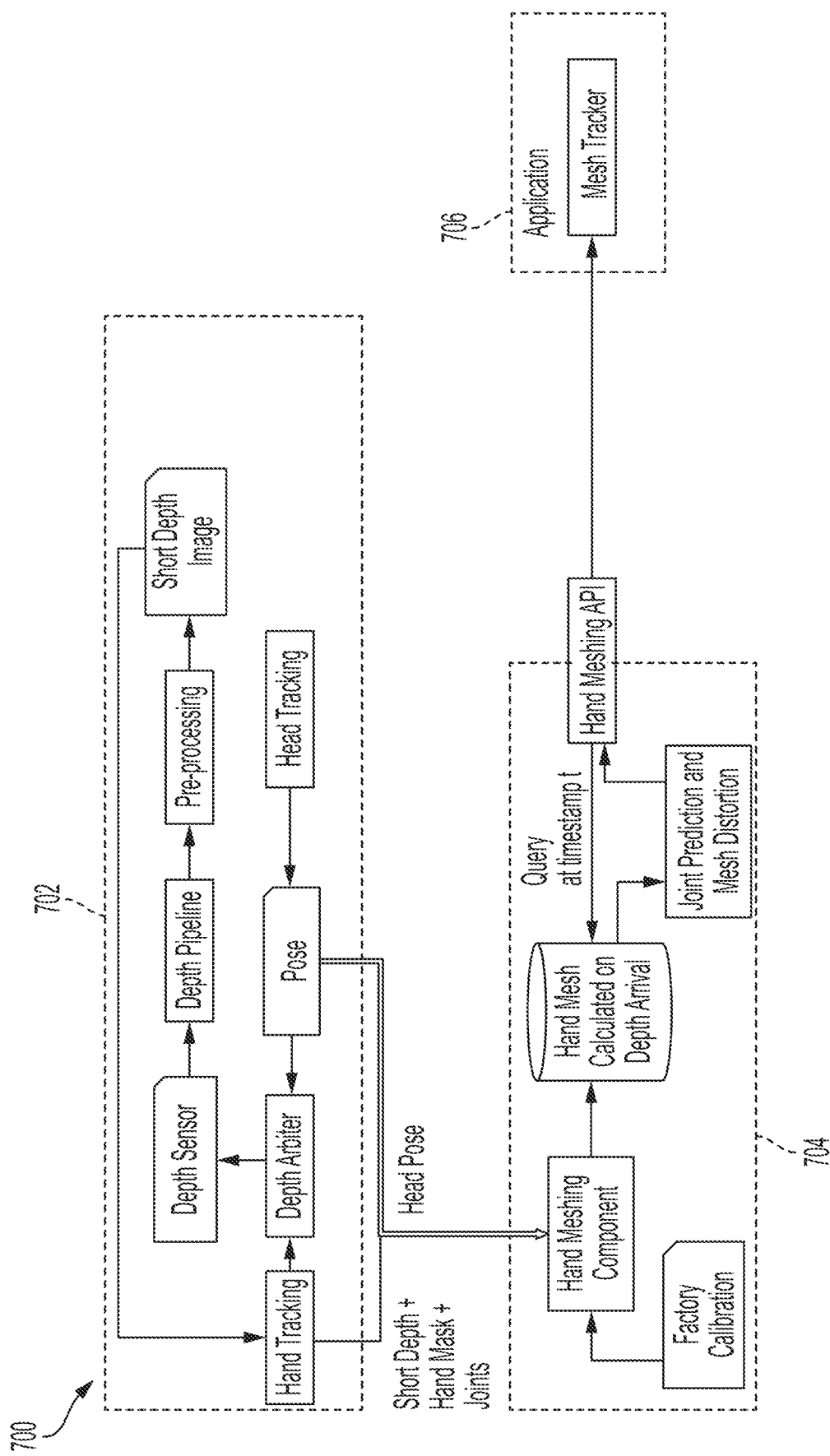
FIG. 7 is a schematic diagram illustrating an AR system configured to generate hand meshes in real time for dynamic occlusion, according to some embodiments.

Information about the physical world may also be used for occlusion processing. That information may be used by a visual occlusion component 164a, which may be part of world reconstruction component 316. Visual occlusion component 164a, for example, may supply information to an application indicating which portions of visual objects are occluded by physical objects. Alternatively or additionally, visual occlusion component 164a may provide information about physical objects to applications, which may use that information for occlusion processing. As noted above, accurate information about hand position is important for occlusion processing. In an example as described herein, visual occlusion component 164a may, in response to a request by an application, maintain a model of a hand and provide that model to an application when requested. FIG. 7 illustrates an example of such processing, which may be performed across one or more of the components illustrated in FIG. 6, or, in some embodiments, by different or additional components.

FIG. 7 depicts an AR system 700 configured to generate hand meshes in real time for dynamic occlusion processing, according to some embodiments. The AR system 700 may be implemented on an AR device. The AR system 700 may include a data collection portion 702 configured to capture a pose (e.g., head pose, hand pose, and the like) of a user wearing an AR device (e.g., the display device 62) and information of a scene using sensors on the AR device. The information of the scene may include depth information indicating distances between the AR device and physical objects in the scene.

The data collection portion 702 includes a hand tracking component. The hand tracking component may process sensor data, such as depth and image information, to detect one or more hands in the scene. Other sensor data may be processed to detect the one or more hands in the scene. When detected, the one or more hands may be represented in a sparse way, such as by a set of key-points. The key-points, for example, may represent joints, finger tips, or other boundaries of segments of a hand. The information collected or generated by the data collection portion 702 may be passed to a hand meshing portion 704 to be used to generate a richer model of the one or more hands, for example, a mesh, based on the sparse representation.

The hand meshing portion 704 is configured to compute hand meshes of the detected one or more hands and update the hand mesh in real time as the pose changes and/or the hand moves.

The AR system 700 may include an application 706 configured to receive the hand mesh from the hand meshing portion 704 and to render one or more virtual objects in the scene. In some embodiments, the application 706 may receive occlusion data from the hand meshing portion 704. In some embodiments, the occlusion data may indicate portions of the virtual object are occluded by the one or more hands. In some embodiments, for example in the illustrated embodiment, the occlusion data may be a model of the one or more hands from which the application 706 may compute occlusion data. As a specific example, the occlusion data may be a hand mesh of one or more hands received from the hand meshing portion 704.

Figure 8:
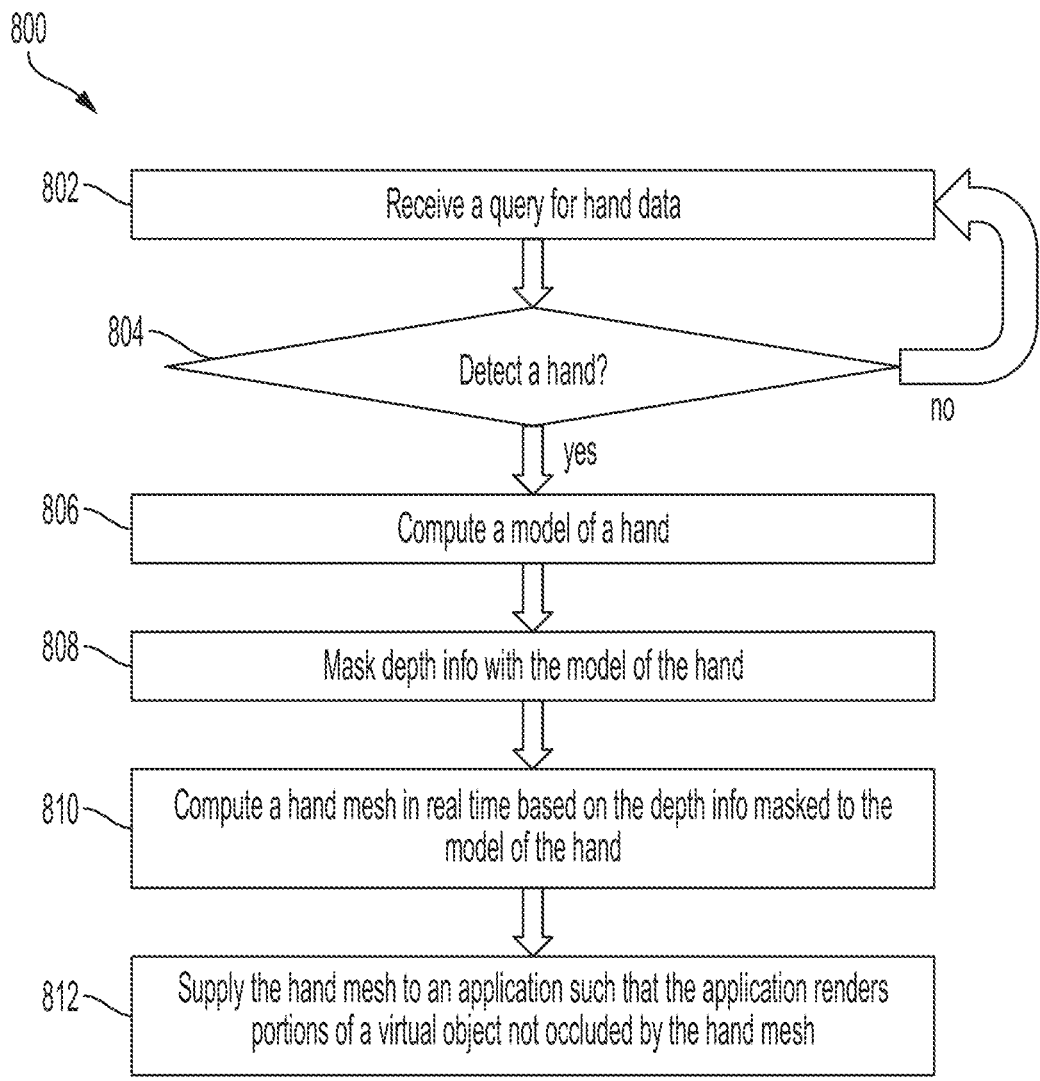
FIG. 8 is a flow chart illustrating a method of generating a hand mesh in real time for dynamic occlusion, according to some embodiments.

FIG. 8 is a flow chart illustrating a method 800 of generating a hand mesh in real time for dynamic occlusion, according to some embodiments. In some embodiments, the method 800 may be performed by one or more processors within the AR system 700. The method 800 may start when the hand meshing component 704 of the AR system 700 receives (Act 802) from the application 706 of the AR system 700 a query for data related to one or more hands in the scene. The method 800 may include detecting (Act 804) one or more hands in the scene based on information of the scene captured by the data collection portion 702 of the AR system 700.

When one or more hands are detected, the method 800 may include computing (Act 806) one or more models of the one or more hands based on the information of the scene. The one or more models of the one or more hands may be sparse, indicating positions of key-points on the hand, rather than surfaces. Those key-points may represent joints or terminal portions of segments of a hand. The key-points may be recognized from sensor data about the one or more hands, including for example stereo images of the one or more hands. Depth information and, in some instances, monocular images of the one or more hands may alternatively or additionally be used to identify key-points.

U.S. provisional patent application No. 62/850,542 entitled "Hand Pose Estimation" describes exemplary methods and apparatus of obtaining information about hand positions and poses and modeling hands based on the obtained information. A copy of the filed version of U.S. App. No. 62/850,542 is attached as an appendix and is hereby incorporated by reference in its entirety for all purposes. Techniques as described in that application may be used for constructing a sparse model of the hand.

In some embodiments, the one or more models of the one or more hands may be computed based on the information of the scene captured by the sensors of the AR device. Examples of the information of the scene include an exemplary image of FIG. 9A captured by one sensor corresponding to a single eye, two exemplary images of FIG. 9B captured by two sensor corresponding to left and right eyes, and an exemplary depth image of FIG. 9C, which may be obtained at least partially from the image of FIG. 9A or the images of FIG. 9B.

In some embodiments, the one or more models of the one or more hands may include multiple key-points of the hand, which may indicate points on segments of the hand. Some of the key-points may correspond to joints of the hand and tips of fingers of the hand. FIG. 9E and FIG. 9F depict schematic diagram illustrating an exemplary eight key-points model of a hand and an exemplary twenty-two key-points model of a hand, respectively.

In some embodiments, the key-points of the model of the hand may be used to determine an outline of the hand. FIG. 9D depicts an exemplary outline of a hand, which may be determined based on key-points of the model of the hand. For example, adjacent key-points may be connected by lines, as illustrated schematically in FIGS. 9E and 9F, and the outline of the hand may be indicated as a distance from the lines. The distances from the lines may be determined from images of the hand, information about human anatomy and/or other information. It should be appreciated that once key-points of a hand are identified, a model of the hand may be updated at a later time using information previously acquired about the hand. The length of the lines connecting key-points, for example, may not change.

The sparse hand model may be used to select a limited amount of data from which a richer model of the hand, including surface information, for example, might be constructed. In some embodiments, the selection may be made by masking, using the outline of the hand, additional data, such as depth data. Accordingly, the method 800 may include masking (Act 808), with the one or more models of the one or more hands, depth information indicating distances between the AR device and the physical objects in the scene.

Figure 10:
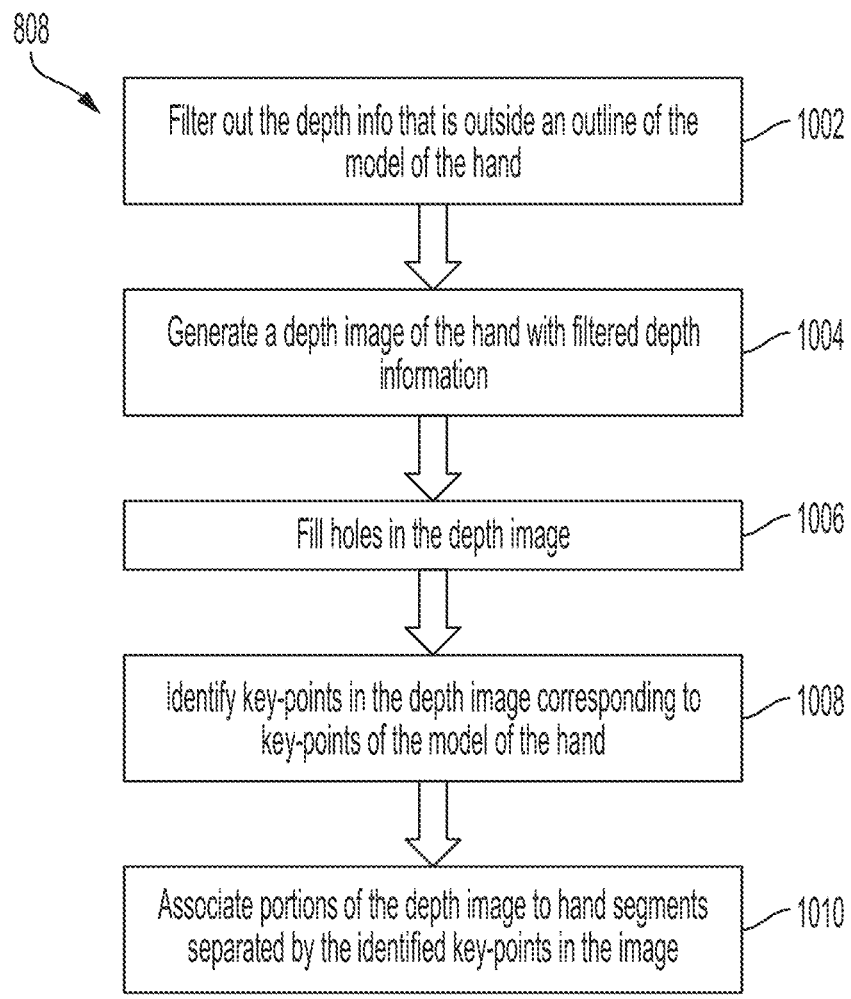
FIG. 10 is a flow chart illustrating details of masking depth information with a model of a hand of FIG. 8, according to some embodiments.

FIG. 10 depicts a flow chart illustrating details of masking (Act 808) the depth information with one or more models of one or more hands, according to some embodiments. The Act 808 may include filtering out (Act 1002) the depth information that is outside the outline of the one or more models of the one or more hands. This act results in removing depth information associated with physical objects other than hands in the scene. The Act 808 may include generating (Act 1004) a depth image of the one or more hands based on the filtered depth information.

The depth image may include pixels, each of which may indicate a distance to a point of the one or more hands. In some embodiments, depth information may be captured in a way that depth information is not captured for all surfaces of the one or more hands. For example, depth information may be captured with an active IR sensor. If a user is wearing a ring with a dark stone, for example, the IR may not reflect from the dark ring such that there will be a hole in the inadequate information was collected. The Act 808 may include filling (Act 1006) holes in the depth image. In some embodiments, the holes may be filled by identifying holes in the depth image and generating, from a stereo camera of the AR device, stereo depth information corresponding to the identified regions. In some embodiments, the holes may be filed by identifying holes in the depth image and accessing, from one or more 3D models of one or more hands, surface information corresponding to the identified regions.

Optionally, the one or more hand meshes may be computed as multiple sub-meshes, each sub-mesh representing a segment of the one or more hands. The segments may correspond to the segments bounded by key-points. As many of those segments are bounded by joints, the segments correspond to portions of the hand that can move independently of at least some other segments of the hand, such that the hand mesh might be quickly updated by updating the sub-meshes associated with segments that moved since that last hand mesh computation. In such an embodiment, Act 808 may include identifying (Act 1008) key-points in the depth image corresponding to key-points of the one or more models of the one or more hands. Hand segments separated by the key-points may be computed. The Act 808 may include associating (Act 1010) portions of the depth image to hand segments separated by the identified key-points in the depth image.

The method 800 may include computing (Act 810) one or more hand meshes based on the depth information masked to the one or more models of the one or more hands. The one or more hand meshes may be a representation of the one or more hands indicating surfaces of the one or more hands.

FIG. 9G depicts a computed dense hand mesh, according to some embodiments. However, the present application is not limited to computing dense hand meshes. In some embodiments, sparse hand meshes may be sufficient for dynamic occlusion.

In some embodiments, the one or more hand meshes may be computed from depth information. For example, a mesh may be a collection of regions, often represented as triangles, that represent a portion of a surface. Such regions may be identified by grouping adjacent pixels in the depth image for which a difference in distance is less than a threshold, indicating that the pixels are likely on the same surface. One or more triangles bounding such regions of pixels may be identified and added to the mesh. However, other techniques for forming a mesh from depth information may be used.

Computing the one or more hand meshes may include updating the one or more hand meshes in real time as relative locations between the AR device and the one or more hands change. There may be a latency between the time at which the information of the scene used to compute one or more hand meshes is captured and the time at which one or more computed hand meshes are used, for example, by an application, for example, to render content. In some embodiments, motion of segments of the one or more hands may be tracked such that future positions of those segments of the one or more hands may be projected/predicted. The one or more hand meshes may be distorted to conform to projected locations of the segments at the time that virtual objects, processed using the one or more hand meshes, will be rendered.

Figure 11:
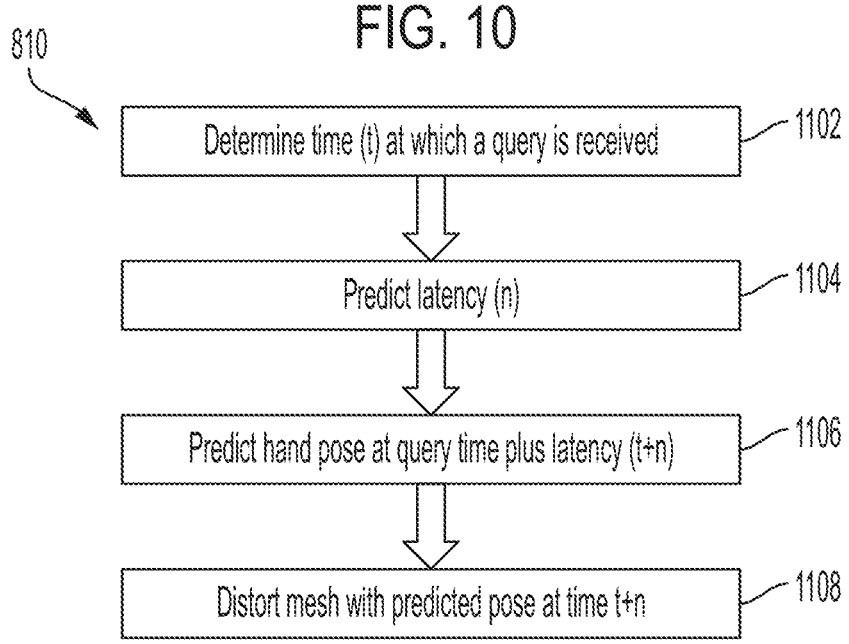
FIG. 11 is a flow chart illustrating details of computing hand mesh in real time based on the depth info masked to the hand segmentation of FIG. 8, according to some embodiments.

FIG. 11 depicts a flow chart illustrating details of computing (Act 810) the one or more hand meshes in real time based on the depth info masked to the hand segmentation, according to some embodiments. The Act 810 may include determining (Act 1102) a time t at which the hand meshing portion 704 receives the query for the data related to the one or more hands from the application 706.

The Act 810 may include predicting (Act 1104) a latency n from the query received, from the application 706, at time t. The Act 810 may include predicting (Act 1106) a pose (e.g., hand pose) at a time of the query time t plus the latency n. The Act 810 may include distorting (Act 1108) the one or more hand mesh with the predicted pose at the time of the query time t plus the latency n. In some embodiments, predicting the hand pose may include predicting the movements of key-points of the one or more hands in the depth image at the time of the query time t plus the latency n. Such a prediction may be made based on tracking the positions of the key-points over time. Such tracking enables parameters of motion such as velocity or acceleration to be determined. A projection of position may be made based on an extrapolation from a prior position to a future position assuming the determined parameters of motion remain the same. Alternatively or additionally, a projection may be determined using a Kalman filter or similar projection technique.

In some embodiments, distorting the one or more hand meshes with the predicted pose may include distorting portions of the one or more hand meshes corresponding to a subset of hand segments, which are between key-points predicted to change at the time of the query time t plus the latency n.

In distorting a previously computed mesh to represent one or more hands at time t plus the latency n, multiple factors might be considered. The value of n, for example, may reflect the time required for processing to distort the one or more meshes as well as for an application to use the one or more meshes in rendering an object. That value may be estimated or measured from the structure or tests in the operation of the software. As another example, the value may be determined dynamically based on measuring latency in use or adjusting a previously established latency based on processing load at the time the request for one or more meshes is made.

In distorting the one or more meshes, the amount of distortion may be based on the time at which the data used to form one or more hand meshes was captured as well as the latency until the one or more meshes will be used. In some embodiments, the one or more hand meshes may be created other than in response to a request from an application. For example, once an application indicates, such as by making a call through an API, that it is configured for occlusion processing, the AR system may compute one or more updated hand meshes periodically. Alternatively, a hand tracking process may run continuously, using a certain amount of computational resources of the system. In any event, the one or more hand meshes may be updated relatively frequently, such as at least 30 times per second. Nonetheless, there may be a delay between when the data was captured to make the mesh and when the request for the mesh was received, and this delay may also be accounted for in distorting the hand mesh.

The method 800 may include supplying (Act 812) the one or more hand meshes to the application 706 such that the application renders portions of a virtual object not occluded by the one or more hand meshes.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A non-transitory computer-readable medium encoded with computer executable instructions that, when executed on at least one processor coupled to a depth sensor configured to capture depth information of a scene indicating distances to physical objects in the scene, control the at least one processor to generate a mesh of a hand according to a method comprising:
    masking, with a model of the hand, the depth information indicating distances to the physical objects in the scene; and
    computing a hand mesh based on the depth information masked to the model of the hand, the computing comprising updating the hand mesh in real time as relative locations between the depth sensor and the hand change.

2. The non-transitory computer-readable medium of claim 1, wherein:
    the method further comprises computing the model of the hand based, at least in part, on sensed information about the scene.

3. The non-transitory computer-readable medium of claim 2, wherein:
    the model of the hand comprises a plurality of key-points of the hand indicating points on segments of the hand; and
    at least a portion of the plurality of key-points of the hand correspond to joints of the hand and tips of fingers of the hand.

4. The non-transitory computer-readable medium of claim 2, wherein:
    the method further comprises determining an outline of the hand based on the plurality of key-points; and
    masking the depth information comprises:
        filtering out the depth information that is outside the outline of the model of the hand; and
        generating a depth image of the hand based, at least in part, on the filtered depth information, the depth image comprising a plurality of pixels, each pixel indicating a distance to a point of the hand.

5. The non-transitory computer-readable medium of claim 4, wherein filtering out the depth information that is outside the outline of the model of the hand comprises:
    removing depth information associated with the physical objects in the scene.

6. The non-transitory computer-readable medium of claim 4, wherein masking, with the model of the hand, the depth information indicating the distances to the physical objects in the scene comprises:
    associating portions of the depth image to hand segments; and
    updating the hand mesh in real time comprises selectively updating portions of the hand mesh representing a proper subset of the hand segments.

7. The non-transitory computer-readable medium of claim 6, wherein the method further comprises:
    filling holes in the depth image before computing the hand mesh.

8. The non-transitory computer-readable medium of claim 7, wherein filling holes in the depth image comprises:
generating stereo depth information from a stereo camera mechanically coupled to the depth sensor, the stereo depth information corresponding to regions of the holes in the depth image.

9. The non-transitory computer-readable medium of claim 7, wherein filling holes in the depth image comprises:
accessing surface information from a 3D model of a hand, the surface information corresponding to regions of the holes in the depth image.

10. The non-transitory computer-readable medium of claim 1, wherein computing the hand mesh based on the depth information masked to the model of the hand comprises:
predicting a latency n from a query received at time t from the application rendering the virtual object in the scene for the data related to a hand in the scene;
predicting a hand pose at a time of the query time t plus the latency n; and
distorting the hand mesh with the predicted pose at the time of the query time t plus the latency n.

11. The non-transitory computer-readable medium of claim 1, wherein the depth information indicating the distances to the physical objects in the scene comprises a sequence of depth images at a frame rate of at least 30 frames per second.

12. An electronic system comprising:
a device comprising
a display configured to render a virtual object and
one or more sensors configured to capture a pose of the device and information of a scene comprising one or more physical objects, the information of the scene comprising depth information indicating distances between the device and the one or more physical objects; and
a hand meshing component configured to execute computer executable instructions to detect a hand in the scene and compute a hand mesh of the detected hand and update the hand mesh in real time as the pose changes and/or the hand moves.

13. The electronic system of claim 12, wherein:
the hand meshing component is configured to compute a hand mesh by:
identifying key-points on the hand;
computing segments between the key-points;
selecting, from the depth information, information based on proximity to one or more of the computed segments; and
computing a mesh representing at least a portion of the hand mesh based on the selected depth information.

14. The electronic system of claim 13, wherein:
the depth information comprises a plurality of pixels, each of the plurality of pixels representing a distance to an object in the scene; and
computing the mesh comprises grouping adjacent pixels representing a difference in distance less than a threshold.

15. A method of operating an electronic system to render a virtual object in a scene including physical objects, wherein the electronic system comprises at least one processor, and the method comprises, with the at least one processor:
processing sensor captured information to detect a hand in the scene and compute points on the hand;
selecting, based on proximity to the computed points on the hand, a subset of the depth information; and
computing a representation of the hand based on the selected depth information, wherein the representation of the hand indicates surfaces of the hand.

16. The method of claim 15, further comprising:
storing the computed representation of the hand; and
successively processing captured information to update the stored representation of the hand.

17. The method of claim 15, wherein:
computing the representation of the hand comprises:
computing, based on the captured information, one or more parameters of motion of the hand;
projecting, based on the one or more parameters of motion, a position of the hand at a future time, determined based on a latency associated with rendering a virtual object using the computed representation of the hand; and
morphing the computed representation of the hand to represent the hand in the projected position.

18. The method of claim 15, further comprising:
rendering a selected portion of the virtual object based on the representation of the hand, wherein the selected portion represents portions of the virtual object not occluded by the hand.

19. The method of claim 15, wherein:
the depth information comprises a depth map comprising a plurality of pixels, each representing a distance; and
computing the representation of the hand based on the selected depth information comprises identifying groups of pixels representing surface segments.

20. The method of claim 19, wherein:
computing the representation of the hand comprises defining a mesh representing the hand based on the identified groups of pixels.

* * * * *